Dec. 5, 1944.　　　R. H. McKANNA ET AL　　　2,364,230
ASSEMBLY DEVICE
Filed Dec. 17, 1941　　　2 Sheets-Sheet 1

Dec. 5, 1944.　　　P H. McKANNA ET AL　　　2,364,230
ASSEMBLY DEVICE
Filed Dec. 17, 1941　　　2 Sheets-Sheet 2

R. H. McKanna
J. L. Ross
INVENTORS

C. C. McRae and
Robert A. Farris
BY
ATTORNEYS.

Patented Dec. 5, 1944

2,364,230

UNITED STATES PATENT OFFICE 2,364,230

ASSEMBLY DEVICE

Robert H. McKanna and James L. Ross, Dearborn, Mich., assignors to Ford Motor Company, Dearborn, Mich., a corporation of Delaware Application December 17, 1941, Serial No. 423,396

1 Claim. (Cl. 29—285)

This invention relates to internal-combustion engines; and, more particularly, to a method of assembling radial engines and to fixtures which may be used to facilitate the assembly.

In the radial engine, connecting rods lead from each cylinder to the throw of the crank. One of these rods, known as the master rod, has an enlarged lower end surrounding the throw, while the others, known as link rods, are pivoted to the said lower end. This invention is particularly applicable in the construction in which the master rod is solid and the crankshaft is split at each throw to permit the assembly of the master rod thereon.

The preferred method of assembly of these rods entails connecting the link rods to the master rod, and then bringing this rod subassembly into engagement with the throw of the shaft. At this stage, the assembled elements include, principally, a portion of the engine crankcase ring, the crankshaft and the rod subassembly. The outer end of each rod is then adjacent to the opening in the crankcase ring which is to accommodate its particular cylinder. In the radial engines which employ a small number of cylinders, it is not difficult to arrange and position the rod subassembly in such a way that it will be readily received on the shaft and the individual rods correctly received in the crankcase ring. However, in the larger engines in which there are as many as nine cylinders, and the weight and size of the rods are increased proportionately, the problem is not simple.

It is rendered more difficult by the fact that the rods must not come in contact with each other or with the crankcase ring during the assembly stages or injury to both will result. When in the assembled position, they must be secured against such contact while the pistons are applied and until the cylinder barrels are engaged.

It is therefore an object of this invention to provide a method by which a rod subassembly can be aligned and held in that alignment during the assembly of it with the crank. It is a further object to maintain this subassembly in its proper position during the completion of the crankcase and thereafter until the rods are engaged in their respective cylinders.

Yet another object is to provide assembly fixtures to be used not only in making the subassembly and applying it to the engine assembly, but also to be used in securing the subassembly in proper position thereon during each succeeding assembly step.

With these and other objects in view, the invention consists of the arrangement, construction and combination of the various parts of the improved device, as described in the specification, claimed in the claim and illustrated in the accompanying drawings in which:

Figure 1:
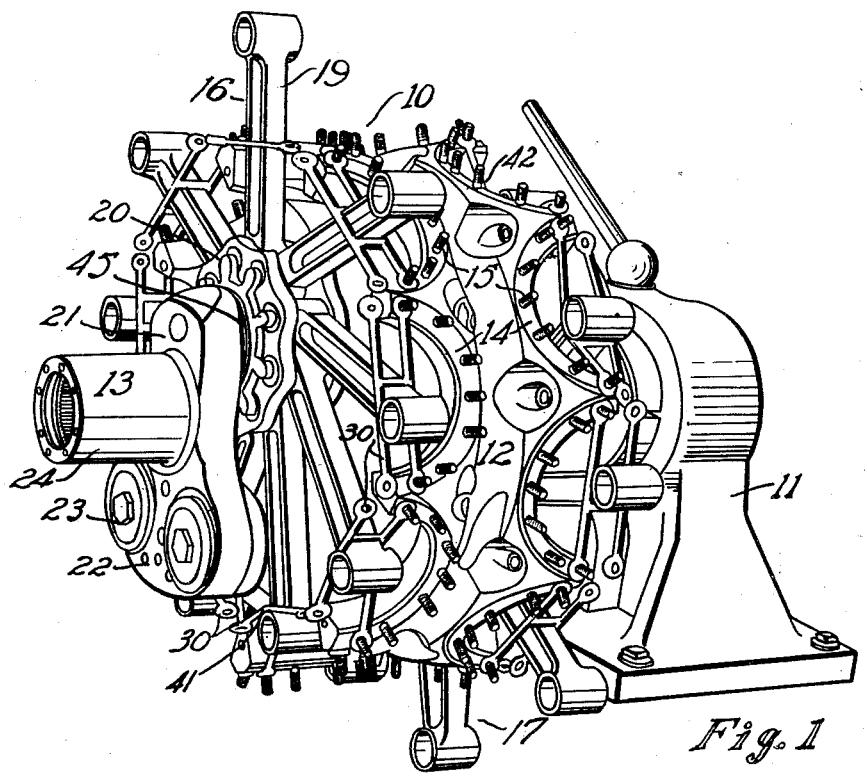
Figure 1 is a perspective view of a partially assembled engine mounted on the assembly block.
Figure 2:
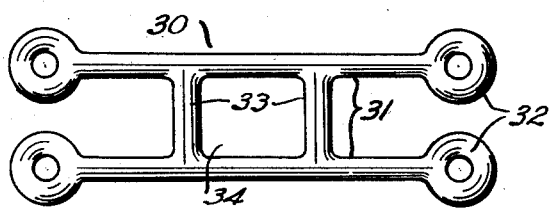
Figure 2 is a plan view of the retainer.

Referring to Figure 1, a radial engine 10 having two 9-cylinder banks is shown, partially assembled, mounted on the assembly block 11. As a specific example, the motor used is of the Pratt and Whitney type, although this invention may be used equally with all other radial engines where there are one or more banks.

The engine 10, in the stage of assembly shown, includes the central crankcase ring 12 which encloses and forms a bearing for the crankshaft 13 and to which are attached at intervals around its periphery the cylinder barrels which are not shown at this stage of the assembly. These barrels are attached at the shoulders 14 by means of the studs 15. The assembly, as shown, has both the rod subassemblies 16 and 17 in position. Referring to the front assembly 16, this includes the master rod 18 and the eight associated link rods 19. The big end 20 of the master rod 18 is journaled on the crankshaft throw 45 which is split to permit the application of the solid rod journal. Thereafter, the outer cheek 21 screws onto the throw and associated with it is the counterweight 22, the balancing mechanism 23 and the shaft bearings 24.

It will be understood that the successive steps in assembly would include the step of applying the outer crankcase rings which co-operate with the center crankcase ring 12 at each end thereof. Thereafter, pistons are attached to the rods 18 and 19 and the pistons are engaged in cylinder barrels which are then bolted to the shoulders 14 by the studs 15. These steps are, of course, entirely conventional in this form of assembly and therefore are not illustrated or described in greater detail. The invention here involved is to be found principally in the means of handling the rod subassembly, rather than in the later steps.

Figure 3:
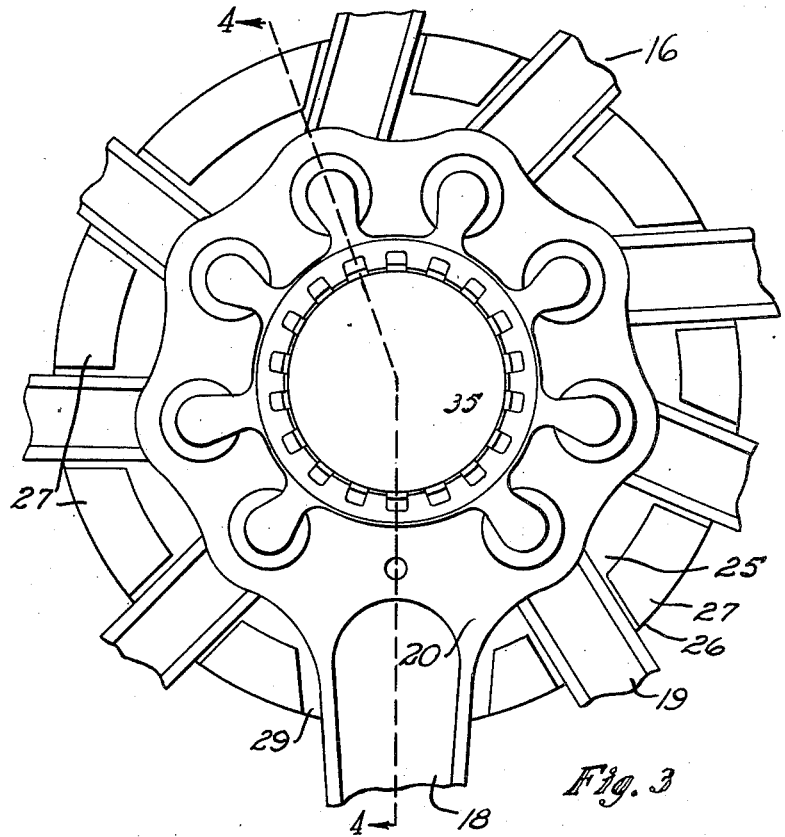
Figure 3 is a plan view of the fixture used in making up the rod subassembly and applying it to the crankshaft, a portion of the rod subassembly being shown.
Figure 4:
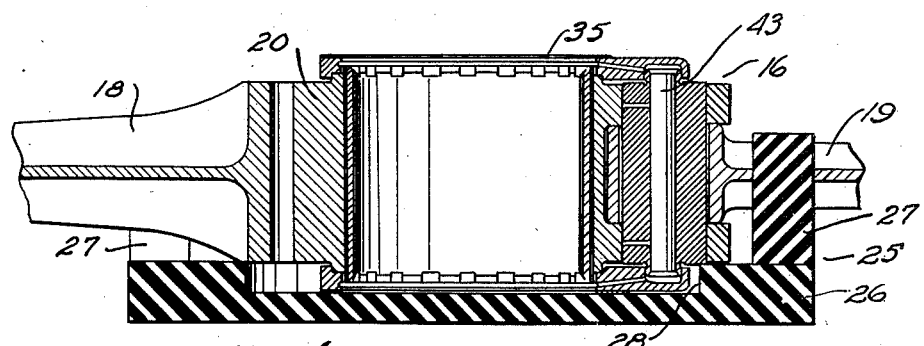
Figure 4 is a sectional elevation taken on the line 4—4 of Figure 3.

Referring now to Figures 3 and 4, the subassembly fixture 25, comprising a circular plate 26 and a number of upstanding lugs 27 secured to it, is shown. This plate is designed to accommodate the rod subassembly 16, the big end 20 of the master rod 18 being held in the counterbore 28, while the individual rods 19 are held between successive lugs. It will be noted that each of these lugs is of different shape, this being done so that the rods, when disposed therein, will be aligned at the proper angle so as to be held substantially in the middle of their respective barrel shoulders 14 when the subassembly is applied to the crankshaft.

In making up the subassembly, the big end of the master rod 18 is engaged with the counterbore 28; the individual rods are then engaged with the big end and pivoted thereto by pins 43, being separated and maintained in proper alignment by means of the lugs 27. Thereafter, the remaining components of the subassembly are added.

It will be noted that when the master rod is spaced in the space 29, which is larger than any of the others, each of the rods is angularly aligned so that it will be placed squarely in the center of its appropriate barrel shoulder 14. Retainers 30, which will be described more fully later, are then slipped over the end of each of the rods. The rod subassembly 16 and fixture 25 are then picked up and the big end 20 of the master rod 18 engaged with the throw 45 of the crankshaft 13, the master rod being aligned in its appropriate barrel shoulder. Consequently, each of the rods is similarly aligned with respect to its respective shoulder.

Referring now to the retainer 30, this is made of flexible rubber and comprises two parallel risers 31 terminating in eyelets 32. Intermediate the ends of the risers are the rungs 33 which, with the risers, define a rod space 34 which is approximately the size of the midsection of the rods 18 or 19. As was stated, one of these retainers 30 is slipped over the end of each of the rods substantially as shown in Figure 1 when in the fixture 25, and while the subassembly is held in aligned position thereby in the crankcase ring, the eyelets 32 on the ends of the inner risers are slipped over opposite studs 15 on the barrel shoulders 14. This is clearly shown in Figure 1. These retainers thus secure each rod in its respective barrel shoulder and the fixture 25 may now be removed. The support afforded each of the rods by its retainer is such that it may work freely in and out of its respective barrel and respond to the rotation of the crankshaft, but they are prevented from hitting the crankcase during any of these movements.

Thereafter, as described above, the crankshaft assembly is completed by adding the cheek 21, counterweight 22 and bearing 24. An outer crankcase ring is then applied and secured to the center ring 12. The eyelets on the outer risers of each of the retainers may then be engaged with corresponding studs on the outer crankcase ring. Pistons may then be affixed to the outer ends of the rods and a cylinder barrel engaged with each piston and brought down to the studs 15. This, of course, maintains the proper alignment of the respective rods. The retainer may then be pulled clear of the studs and rod and the engagement of the barrel with the crankcase ring completed. Thereafter, of course, the rod is guided by the piston and the barrel and no further auxiliary support is required.

The retainer is equally useful when the motor is being disassembled. In the past, considerable difficulty has been encountered, particularly when the barrel and pistons associated with the master rod were removed. When this was done, the master rod, in some positions, would rotate further and fall within the casing. Not only did this cause damage to the shoulder portions of the crankcase, but the other rods were jammed and it was most difficult to remove any of them. To avoid this, as each cylinder and piston are removed, the rod is blocked and the retainer immediately slipped over it and engaged with the appropriate studs. This is done as each rod is exposed and when all of the pistons and cylinders, or such as may be desired, have been removed, the engine shaft may be rotated without fear of jamming the assembly.

Because of the flexibility of the retainers, the appropriate movement of each of the arms is readily permitted, as may be seen in Figure 1 at 40 or 41 where the rods are drawn inwardly and the retainers correspondingly bend with them. In the other positions shown, the rods are well toward the outward position and the only function of the retainer is to guide them within the confines of the shoulder. The cost of the individual retainers is negligible, so they may be removed from the rods by cutting one of the rungs after the piston has been assembled to the rod. The subassembly fixture, of course, may be used over and over again as desired, inasmuch as it is not affected during the assembly process.

The principal advantage is that by the use of the fixture and retainer, and the method outlined, both the formation of the subassembly of the rod and its application to the motor assembly are facilitated and may be accomplished in much less time than heretofore. In addition, and this too is most important, both the rods and the crankcase segments are protected from each other throughout and there is no possibility of damage to either. Further, the retaining method is such that the shaft may be rotated at any time for the purpose of adjustment or checking without changing the retaining means or encountering any difficulty or damage.

Some changes may be made in the arrangement, construction and combination of the various parts of the improved device and in the steps of the method thereto appertaining without departing from the spirit of the invention, and it is the intention to cover by the claim such changes as may reasonably be included within the scope thereof.

We claim as our invention:

In an engine assembly means to retain a connecting rod temporarily with respect to an engine block, supporting means adapted to engage the shank of an engine connecting rod intermediate the bearings thereon, comprising, a pair of risers of flexible and resilient material disposed in spaced side by side position and in substantial parallelism, a pair of spaced rungs of said material integrally joined to and extending between said risers intermediate the ends of said risers, said risers and rungs being so spaced that the area defined therebetween conforms substantially to the cross section of the shank of said rod and is substantially less than the projected area of the bearings on said rod, and eyelet means formed integral with said risers at the ends thereof, said eyelet means adapted to engage studs on said engine block.

R. H. McKANNA.
JAMES L. ROSS.